(12) United States Patent
Maruta

(10) Patent No.: US 7,614,868 B2
(45) Date of Patent: Nov. 10, 2009

(54) DISPLAY APPARATUS AND METAL MOLD STRUCTURE

(75) Inventor: Naoto Maruta, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 249 days.

(21) Appl. No.: 11/267,519

(22) Filed: Nov. 4, 2005

(65) Prior Publication Data

US 2006/0099286 A1 May 11, 2006

(30) Foreign Application Priority Data

Nov. 5, 2004 (JP) .......................... 2004-006520 U

(51) Int. Cl.
*B29C 45/37* (2006.01)

(52) U.S. Cl. ........................ 425/542; 425/398; 425/416; 425/470

(58) Field of Classification Search ................. 425/173, 425/542, 398, 412, 416, 470; 264/318, 328.3, 264/328.7; 249/142

See application file for complete search history.

(56) References Cited

U.S. PATENT DOCUMENTS

| | | | | |
|---|---|---|---|---|
| 3,006,030 A | * | 10/1961 | Paull | 264/318 |
| 4,778,632 A | * | 10/1988 | Bakalar | 264/2.2 |
| 4,853,790 A | * | 8/1989 | Dickie | 348/819 |
| 5,363,150 A | * | 11/1994 | Kojima | 348/836 |
| 5,393,474 A | * | 2/1995 | Souders | 264/163 |
| 5,688,537 A | * | 11/1997 | Brams et al. | 425/186 |
| 5,863,106 A | * | 1/1999 | Beak | 312/7.2 |
| 6,746,634 B2 | * | 6/2004 | Shimakura | 264/1.9 |
| 2005/0212155 A1 | * | 9/2005 | Matsuzawa et al. | 264/1.32 |
| 2006/0125140 A1 | * | 6/2006 | Saitou | 264/155 |
| 2006/0240138 A1 | * | 10/2006 | Broad et al. | 425/412 |

FOREIGN PATENT DOCUMENTS

| | | |
|---|---|---|
| JP | 61-138519 | 8/1986 |
| JP | 07-308945 | 11/1995 |
| JP | 08-132481 | 5/1996 |
| JP | 08-142230 | 6/1996 |
| JP | 2000-238042 | 9/2000 |

* cited by examiner

*Primary Examiner*—Joseph S. Del Sole
*Assistant Examiner*—Emmanuel S Luk
(74) *Attorney, Agent, or Firm*—Yokoi & Co., U.S.A., Inc.; Peter Ganjian

(57) ABSTRACT

A first metal mold has a convex portion; a second metal mold has a concave portion; the surfaces of both metal molds facing each other have a predetermined clearance between them when the top of the convex portion is in contact with the bottom of the concave portion; the concave portion includes an opening side area defined by a wall facing the convex portion with a predetermined clearance kept when the convex portion is accommodated and a shoulder continuing from the wall, toward the rough center of the concave portion, to the side of the convex portion, and a bottom area in an area drilled down from the opening surrounded by the shoulder, defined by the wall that contacts the side of the top located within a predetermined distance from the top of the convex portion when the convex portion is accommodated, and the bottom that contacts the top.

5 Claims, 6 Drawing Sheets

Prior Art

Prior Art

DISPLAY APPARATUS AND METAL MOLD STRUCTURE

BACKGROUND OF THE INVENTION

1. Field of the Invention

The present invention relates to the structure of a metal mold used to produce a molded article by injecting melted resin into a cavity of predetermined shape, and a display apparatus having a front cabinet molded with such a metal mold.

2. Description of the Prior Art

FIGS. 5 and 6 show cross-sectional views of a metal mold 10. The metal mold 10 is used to mold the front cabinet of a television, and consists of a male mold 20 and a female mold 30. As shown in (1) of FIG. 5, a convex portion 21 is formed at around the center of the surface of the male mold 20 facing the female mold, and a concave portion 31 is formed on the surface of the female mold 30 facing the male mold, in which the convex portion of the male mold 20 can be accommodated. In this construction, as shown in (2) of FIG. 5, when the male mold 20 and the female mold 30 are approximated to each other, and the top surface 21a of the convex portion 21 and the bottom surface 31a of the concave portion 31 are made to contact, the surfaces 22 and 32 will face each other with a predetermined space kept between them, and the sides 21b of the convex portion 21 and the sides 31b of the concave portion will also face each other with a predetermined space kept between them.

By filling in the space between the male mold 20 and female mold 30 formed in this way with melted hot resin and then cooling it down to a predetermined temperature, a front cabinet 40 with the cross section as shown in (1) of FIG. 5 was produced. The cross section of the front cabinet shown in this figure corresponds to the cross section taken on B-B line in FIG. 1. The produced front cabinet 40 houses a display apparatus 50 such as an LCD panel.

In addition, related technologies are also known, such as: a manufacturing method in which plastic molded articles are molded without expanding their outer dimensions and without damaging their textured shapes (Japanese Patent Laid-open Publication No. 1995-308945); a method in which a convex portion is provided at the boundary between the metal mold and film gate (Japanese Patent Laid-open Publication No. 1996-132481); and a technology in which a continuous thick-walled portion is formed around the outer peripheral of a front cabinet to increase its strength (Japanese Patent Laid-open Publication No. 1996-142230).

In the above metal mold 10, it will be seen from FIG. 2 that the convex portion 21 of the male mold 20 forms, at the front side of the front cabinet 40, an opening 42 for exposing outward a display surface 51 of the display apparatus 50 within the front cabinet. Accordingly, one end (a panel touching end 43a) of an inward bent portion 43, which is formed so as to surround the opening 42 from the front edge portion 41 of the front cabinet 40, roughly contacts the display surface 51.

In such a construction, if different types of displays from different manufactures are employed as the display apparatus 50, the display surface 51 may not be always positioned at the same location, and consequently the distance between the display surface 51 and the front of the front cabinet 40 may vary depending on the type of the display apparatus 50. In this case, if there occurs a more than allowable clearance (e.g., 0.2 mm) between the display surface 51 and the panel touching end 43a, that television will be rejected as a defective in the product inspection. Therefore, conventionally, the clearance between the display surface 51 and the panel touching end 43a has been eliminated by modifying the metal mold 10 as described below, to adjust the length of a boss 44 and/or the inward bent portion 43 regardless of types of the display 50.

The case of adjusting the length of the boss 44 is described here. The boss 44 is formed at a plurality position on the inside of the front cabinet 40, projecting toward the rear of the television, and typically is secured with a screw or the like to a corresponding boss or screw hole provided on the rear cabinet. This allows the length of the front of the front cabinet 40 and the display surface 51 to be adjusted by adjusting the length of each boss.

However, to lengthen each boss in this adjustment, it is necessary to drill a plurality of boss molding holes 33 of exactly the same depth, and to shorten each boss 44 it is necessary to fill in (i.e., shallow) the boss molding holes to exactly the same extent. This means that the conventional method of adjusting the length of each boss 44 requires a lot of works or difficult problems when modifying a metal mold. Furthermore, although it is necessary to fill in the boss molding hole 33 by welding with a metal, the portion around the boss molding hole 33 is often made of a material with higher heat conductivity than any other portion of a metal mold, to increase the cooling efficiency. Therefore, the boss molding hole 33 was not a portion that is suitable for adding a metal material by means of welding, because of a possible decrease in the strength of the metal mold or the like.

Next, adjusting the length of the inward-bent portion 43 for employing the metal mold 10 is described. In making the adjustment, a metal mold member P of predetermined thickness t was welded to the top 21a of the convex portion 21 as shown in FIG. 6, and the bottom 31a of the concave portion was shaved off by the thickness t (the level of the bottom 31a before being shaved off is shown by a dotted line, and the level of that after being shaved off is shown by a solid line). That is, the depth of the concave portion 31 is set in advance to a distance at which the display surface 51 of the display apparatus 50 is expected to be closest to the front of the front cabinet 40, and if the length of the inward-bent portion 43 is required, a member of the thickness equal to that length was added to the convex portion 21 and also the concave portion 31 was shaved off by the depth equal to that length.

In other words, the conventional art requires both the welding and shaving works, thus requiring many steps for modifying a metal mold. Moreover, it is difficult to add a member of precise depth to the convex portion 21 and shave off the concave portion by the same depth, often resulting in errors. Because of this, this art is a rather difficult technique of adjusting the length of the inward-bent portion 43, which requires a one-tenth of mm order precision. Furthermore, undesired molded portions called flash may result from the errors around the inward-bent portion 43, thus lowering the quality of the front cabinet 40.

SUMMARY OF THE INVENTION

The present invention has been made in view of the above problem, and therefore an object of the invention is to provide a metal mold that can be modified in accordance with a change in a product to be molded, and also a display apparatus having a front cabinet molded with such a metal mold.

In order to achieve the above object, an embodiment of the present invention provides a metal mold structure comprising a first metal mold and a second metal mold, which is used to produce a molded article by injecting melted resin into a space of predetermined shape, wherein:

the first metal mold has a convex portion projecting toward the second metal mold from a first surface facing the second metal mold;

the second metal mold has a concave portion in which the convex portion is accommodated when the first and second metal molds are approximated to each other on a second surface facing the first metal mold;

a predetermined space is maintained between the first and second surface when the top of the convex portion is in contact with the bottom of the concave portion;

the concave portion is an area drilled from an opening formed on the second surface, consisting of an opening side area defined by a wall of the concave portion facing one side of the convex portion with a predetermined space kept and a shoulder continuing from a wall of the convex portion, toward the rough center of the concave portion, to the opposite wall thereof when the convex portion is accommodated, and an area drilled from the opening surrounded by the shoulder, which is defined by a wall that contacts the side of the top of the convex portion located within a predetermined distance from the position of the top surface of the convex portion when the convex portion is accommodated, and a bottom area defined by the bottom that contacts the top surface.

In the embodiment of the present invention constructed as above, the first metal mold has the convex portion projecting toward the second metal mold on the first surface facing the second metal mold, and the second metal mold has the concave portion in which the convex portion is accommodated when the first and second metal molds are approximated to each other on the second surface facing the first metal mold. Further, when the top of the convex portion is in contact with the bottom of the concave portion, the first and second surface face each other with a predetermined space kept between them. At the same time, the wall of the opening side area of the concave portion faces the wall of the convex portion with a predetermined space kept between them, and the wall of the bottom area of the concave portion, located further down from the shoulder, contacts the wall of the top of the convex portion located within a predetermined distance from the top, and also the bottom of the bottom area, i.e., the bottom of the concave portion contacts the top of the convex portion. That is, by injecting resin into the space formed between the first and second surface, and the space, a continuation of this space, which is surrounded by the wall of the opening side area of the concave portion, the shoulder, and the side of the convex portion, a molded article can be produced. If a need arises to change the length of a portion to be molded by the space surrounded by the wall of the opening side area, the shoulder, and the side of the convex portion, the change can be made easily and precisely simply by shaving off or filling in the shoulder to change the depth of the shoulder from the second surface.

As another embodiment of the present invention, when the top of the convex portion is in contact with the bottom of the concave portion, the shape of the space formed between the first and second surfaces and that of the space between the wall of the opening side area and the convex portion may be used to mold the front cabinet of a display apparatus.

In other words, the front cabinet of a display apparatus can be considered as an example of the molded articles produced with the metal mold described above.

As a more specific embodiment of the invention, the edge of the front opening for exposing the display surface of a display apparatus may be molded using the space formed between the first and second surface, and the portion contacting the display surface may be molded using the space surrounded by the wall of the opening side area, the shoulder, and the side of the convex portion.

When manufacturing a front cabinet, since the distance between the front of the front cabinet and the display surface of a display apparatus housed in the front cabinet is not always the same, it is necessary to adjust the length of the contacting portion with respect to the position of the display surface so that the contacting portion roughly contacts the display surface. Accordingly, if the contacting portion is molded using the space surrounded by the wall of the opening side area, the shoulder, and the side of the convex portion, as in the above construction, the length of the contacting portion can be adjusted easily and precisely, simply by shaving off or filling in the shoulder to change the depth from the second surface.

Furthermore, in another embodiment, the difference in height between the shoulder and bottom of the concave portion corresponds to the maximum variation in the distance between the front of the front cabinet and the display surface of a display apparatus that can be housed in the front cabinet.

In this case, if the depth from the second surface to the shoulder is made to be equal to the smallest distance (to be exact, the smallest distance minus the distance between the first and second surface) among the distances between the display surfaces of various display apparatuses expected to be housed in the front cabinet and the front of the front cabinet, and also the difference in height between the shoulder and bottom of the concave portion is made to correspond to the maximum variation in the distance between the front of the front cabinet and a display apparatus expected to be housed in the front cabinet, the length of the contacting portion can be changed simply by shaving off the shoulder. Moreover, since the shoulder will not be shaved off deeper than the bottom of the concave portion even if it is shaved off, the space for forming the contacting portion is always defined by the originally existing side of the convex portion. As a result, it is possible to suppress the occurrence of a flash caused by an undesired clearance likely to be formed between the convex and concave portions when a metal mold member is added to the top of the convex portion and also the bottom of the concave portion is drilled down, as in the conventional art.

Based on the above construction, another embodiment of the present invention is possible, wherein: in a metal mold structure consisting of a male mold and a female mold which is used to mold the front cabinet for a display apparatus by injecting melted resin into a space of predetermined shape, the male mold has a convex portion projecting toward the female mold on a first surface facing the female mold; the female mold has a concave portion in which the convex portion is accommodated when the male and female molds are approximated to each other on the second surface; the first and second faces maintain a predetermined space between them when the top of the convex portion is in contact with the bottom of the concave portion; the concave portion is an area drilled from an opening formed on the second surface, which consists of an opening side area defined by the wall facing the side of the convex portion with a predetermined space kept when the convex portion is accommodated, and a shoulder continuing from the wall, toward the rough center of the concave portion, to the side of the convex portion, and an area drilled from the opening surrounded by the shoulder, i.e., the bottom area defined by the wall that contacts the side of the top of the convex portion located within a predetermined distance from the top of the convex portion when the convex portion is accommodated; a space formed between the first and second surface is used to mold the edge of the front side opening for exposing outward the display surface of the display apparatus housed in the front cabinet; a space formed between the wall of the opening side area and the side of the convex portion is used to mold a contacting portion to the display surface; and the difference in height between the shoulder and bottom of the concave portion is equal to the maximum variation in the distance between the front of the front cabinet and the display surface of the display apparatus that can be housed in the front cabinet.

Of course, this specific embodiment has the same effect as the embodiments described above.

As described above, according to the present invention, it is possible to accommodate a change in the member to be molded by a space surrounded by the wall of the opening side area, the shoulder, and the side of the convex portion, by a simple operation of adjusting the depth of the shoulder of the second metal mold. Especially, when manufacturing the front cabinet of a television, a metal mold structure can be provided that allows the length of the contacting portion to the display surface of a display apparatus to be changed with ease, and also a high-quality molded product can be produced.

BRIEF DESCRIPTION OF THE DRAWINGS

Embodiments of the present invention will be described in detail based on the following figures, wherein.

DESCRIPTION OF PREFERRED EMBODIMENTS

Figure 1:
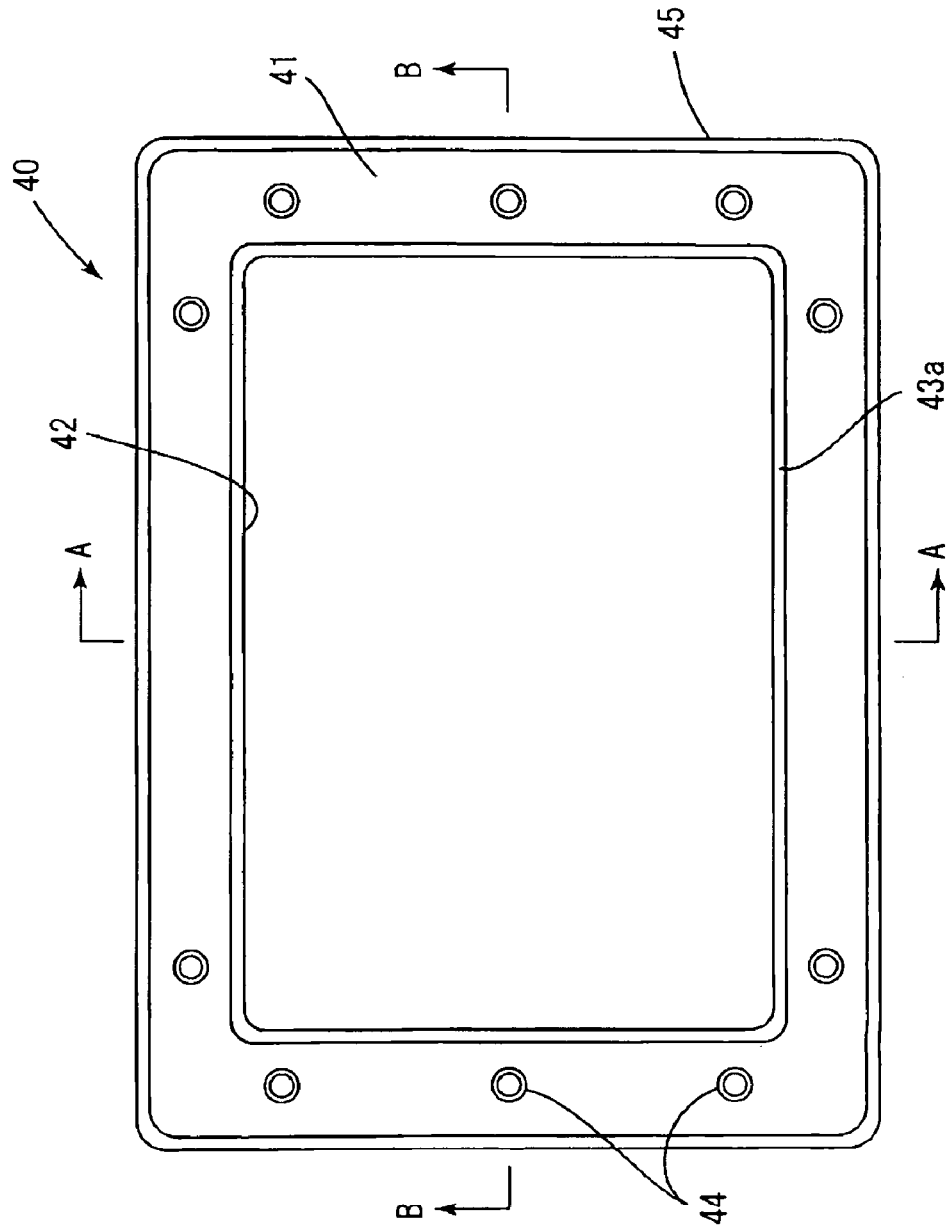
FIG. 1 is a rear view of a front cabinet.
Figure 2:
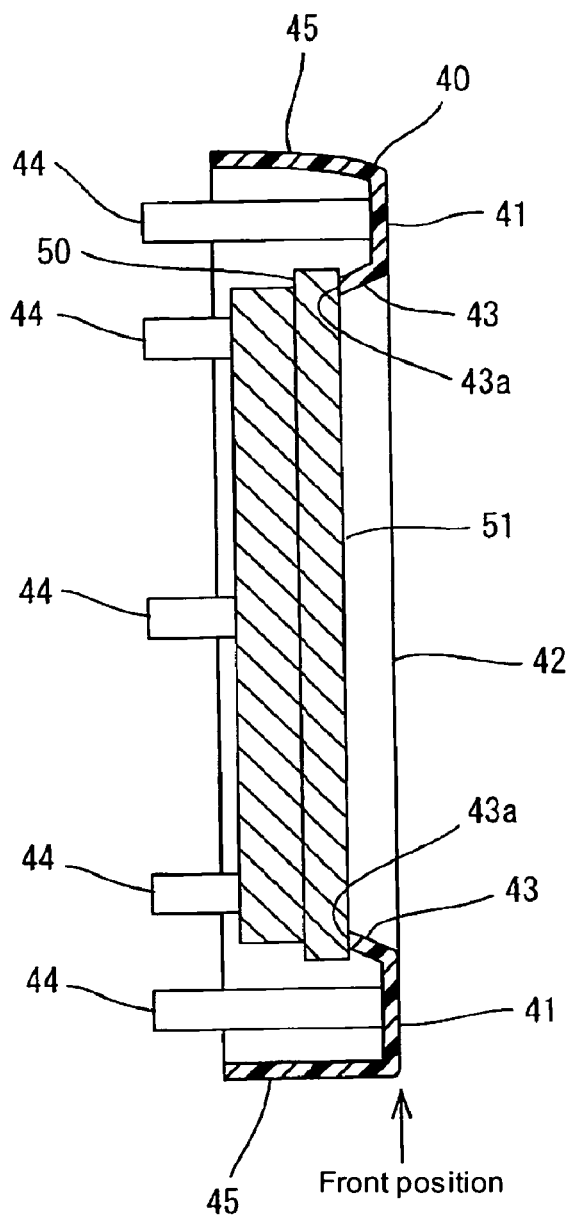
FIG. 2 is a cross-sectional view of the front cabinet and a display apparatus.

FIG. 1 is a real view of a front cabinet 40 molded with a metal mold, and FIG. 2 is a cross-sectional view taken on A-A of the front cabinet 40 housing a display apparatus 50. A rear cabinet disposed behind the front cabinet 40, both of which compose the cabinet of a television, is not shown. The front cabinet 40 is molded from thermoplastic resin, and an opening 42 is formed at around the center of a front edge portion 41 composing the front wall of the front cabinet 40. From the left, right, top, and bottom ends of the front edge portion, a side wall 45 extends toward the rear side.

The display apparatus 50 is housed and fixed in the front cabinet 40 with predetermined fixing means not shown, with a display surface 51 being exposed outward through the opening 42. Although various image display devices such as LCD panel, plasma display panel, and CRT are conceivable as the display apparatus 50, an LCD panel is used in the description of this embodiment.

An inward-bent portion 43 (a contacting portion) is formed that surrounds the opening 42 and bends toward the inside of the front cabinet. In this construction, a panel-touching surface 43a that is an end of the inward-bent portion 43 bending toward the inside of the front cabinet, either contacts the display surface 51 of the display apparatus 50 inside the front panel, or faces the same very closely with a clearance of about several tenth of mm (hereinafter, this state is referred to as rough contact state). Also, at a plurality of locations inside the front cabinet 40, a rough-column shaped boss 44 projecting toward the rear is formed integrally with the front cabinet.

As described above, a plurality of types of products from different manufacturers may be employed as the display apparatus 50 to be housed in the front cabinet 40. This will cause the position of the display surface of the display apparatus 50 within the front cabinet 40 to vary, depending on the type of an employed display apparatus, but it is necessary to make the display surface 51 and panel touching surface 43a rough-contact state, regardless of type of the display apparatus 50. Therefore, this embodiment makes it possible to accommodate a required change in the shape of the inward-bent portion 43 in the manufacture of the front cabinet 40, by employing a metal mold 60 described before.

Figure 3:
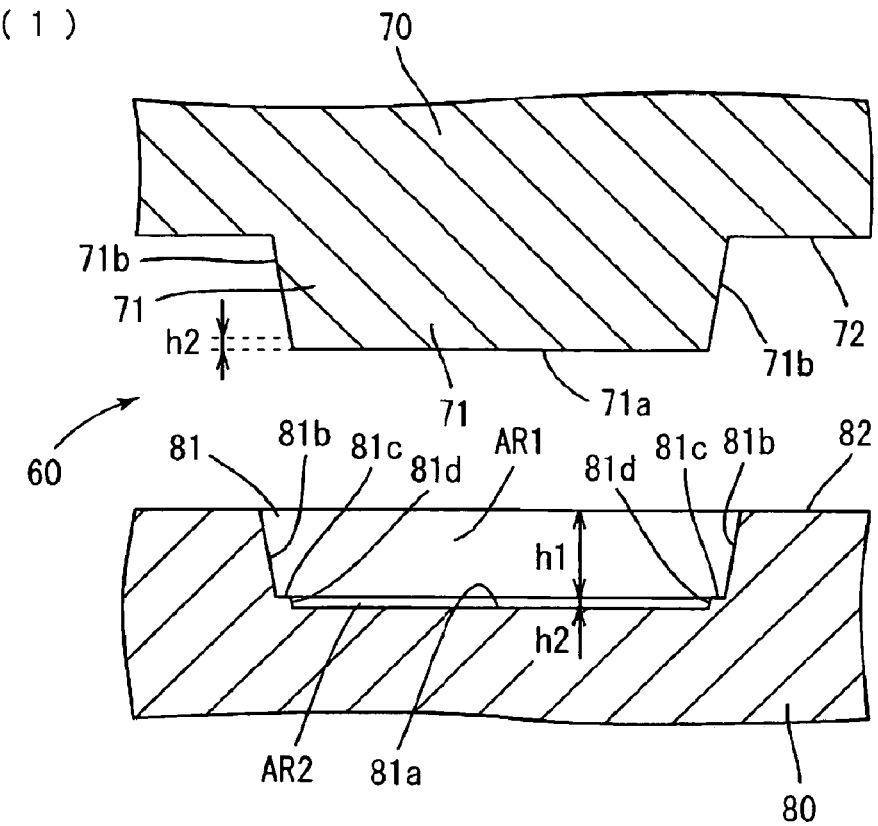
FIG. 3 is a partial cross-sectional view of a metal mold structure according to an embodiment of the present invention.
Figure 3:
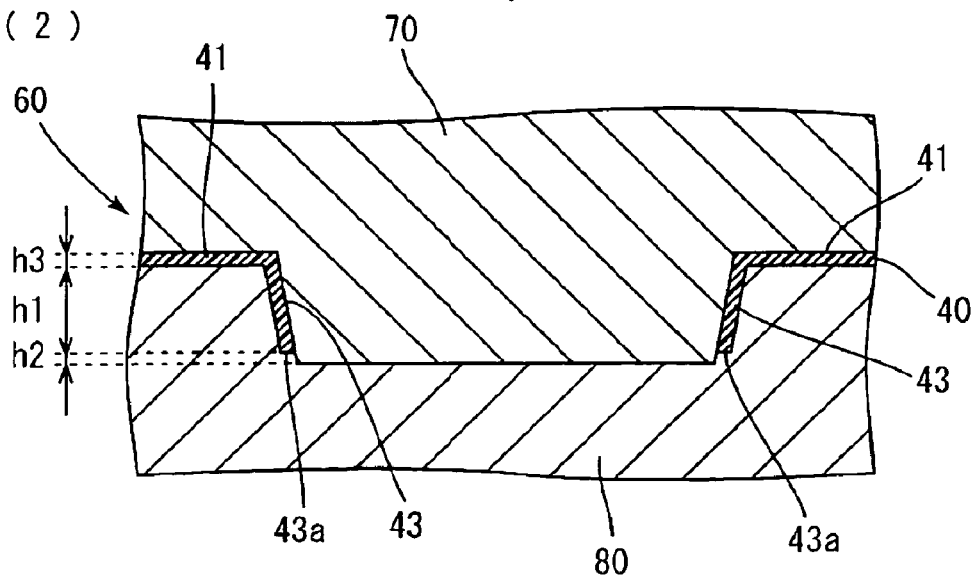

FIG. 3 shows a cross-sectional view of a part of the metal mold 60. Specifically, the metal mold 60 is used to produce the front cabinet 40 of the shape shown in FIG. 1, by filling in a space formed by a male mold 70 (first metal mold) and a female mold 80 (second metal mold) with melted hot resin and cooling down to a predetermined temperature. In order to show the typical part of this invention, part of the metal mold 60 is shown. The cross-section of the front cabinet shown in (2) of FIG. 3 corresponds to the cross-section taken on B-B line of the front cabinet 40 in FIG. 1.

Figure 5:
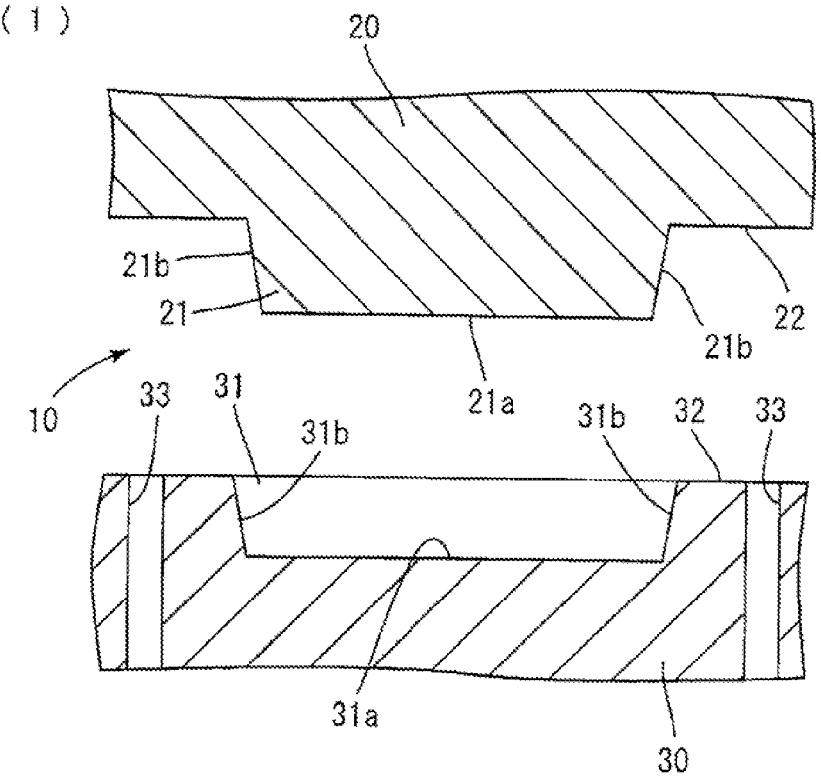
FIG. 5 is a partial cross-sectional view of a conventional metal mold structure.
Figure 5:
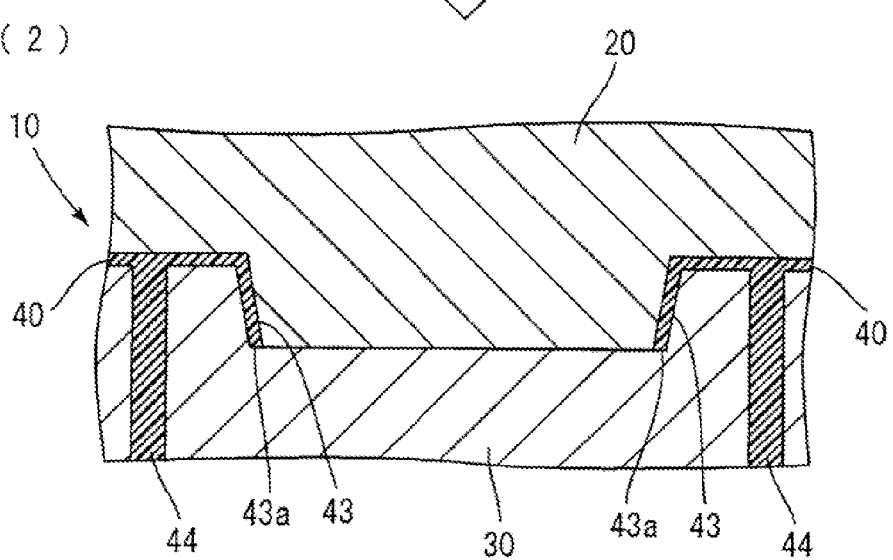

The metal mold 60 consists of a male mold 70, and from a surface 80 of the male mold 70 facing the female mold 80, a convex portion 71 is provided that is formed by projecting a top 71a with predetermined area from a surface 72, and on a surface 82 of the female mold 80 facing the male mold 70, a concave portion 81 in which the convex portion can be accommodated. This rough construction is the same as that of the conventional metal mold 10 shown in FIG. 5. A plurality of boss molding holes are provided on the female mold 80 as in the female mold 30, but not shown in the figure.

A characteristic of the metal mold of the present invention is that, by making the height of the convex portion 71 of the male mold from the surface 72 more than that of the conventional mold, and also by making part of the concave portion 81 of the female mold 80 deeper than that of the conventional mold, it is possible to secure a space in which the convex portion 71 now projecting higher than conventional molds is accommodated. Specifically, when the male mold 70 and male 20 are compared, the convex portion 71 is higher than the convex portion 21 by h2 as a whole. Also, the concave portion 81 consists of an opening side area AR1 and the bottom area AR2, the opening side area AR1 corresponds to the shape of the convex portion of the conventional female mold 30, and the bottom area AR2 becomes a space in which the top located within the distance equal to height h2 forms the top 71a of the convex portion 71.

The opening side area AR1 is defined by the wall 81b continuing from the opening formed on the surface 82, toward the center of the female mold 80, and the shoulder 81c continuing from the innermost position of the wall 81b, toward the rough center of the concave portion 81 roughly in parallel with the surface 82. The depth h1 from the surface 82 to the shoulder 81c becomes the depth from the surface 32 to bottom 31a of the conventional female mold 30. On the other hand, the bottom area AR2 is defined by the wall 81d continuing from an end of the shoulder 81c toward the center of the female mold 80, and the bottom 81a that is the innermost position of the wall 81d. The difference in height from the shoulder 81c to the bottom 81a becomes equal to the above h2.

In this construction, when the male mold 70 and the female mold 80 are combined by contacting the top 71a of the convex portion 71 to the bottom 81a of the concave portion 81, the top of the convex portion 71 is accommodated, with the top entirely in contact with and engaged with the inside of the bottom area AR2. The other parts of the convex portion 71 are roughly accommodated between the side 71b and wall 81b with a predetermined clearance kept. Also, the predetermined clearance h3 is secured between the surface 72 and surface 82. As a result, by injecting melted resin into the space between the surface 72 and surface 82, the front edge portion 41 is molded by the space between the surface 72 and surface 82, and the inward-bent portion 43 is molded by the space surrounded by the wall 81b, shoulder 81c, and side 71b.

That is, if the front cabinet 40 is produced without making any change to the metal mold 60, the distance from the front of the front cabinet 40 to the panel touching surface 43a becomes the sum of the clearance h3 between the surface 72 and surface 82 and the depth h1 from the surface 82 to shoulder 81c. Accordingly, in this embodiment, the male mold 70 and female mold 80 are designed in advance so that the value of h3+h1 becomes equal to the smallest distance between the display surface and the front, when different types of display apparatuses 50 expected to be employed is housed in the front cabinet 40. Furthermore, the difference in height h2 between the shoulder 81c and the bottom 81a is made to be equal to the difference between the largest and smallest distances of the distances between the display surface and the top (maximum variation is, for example, about 2.0 mm), when different types of display apparatuses 50 are housed in the front cabinet 40.

For the front cabinet 40 produced without making any change to the metal mold 60, if the display apparatus of a type that will not make the display surface 51 and the panel touching surface 43a rough-contact state, the required length of the inward-bent portion 43 is obtained by shaving off the shoulder 81c as needed.

Figure 4:
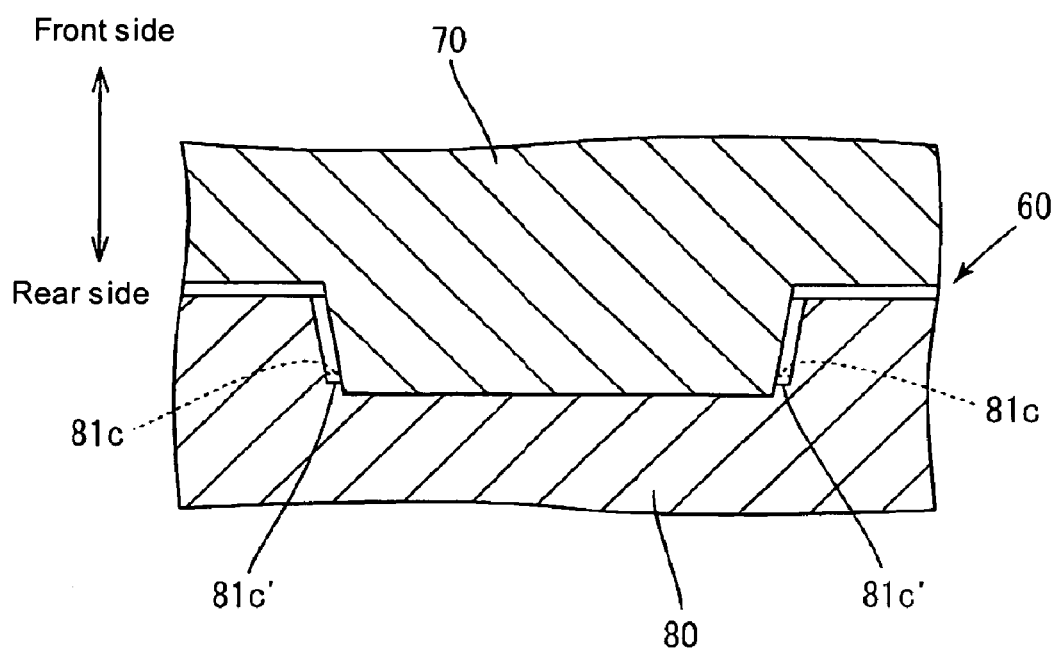
FIG. 4 is a partial cross-sectional view of a modification of a metal mold structure according to an embodiment of the present invention.

FIG. 4 shows the metal mold 60 when the shoulder 81c has been shaved off.

In this figure, the position of the shoulder 81c before being shaved off is shown by a dotted line, and that of the shoulder 81c' after being shaved off is shown by a solid line. For example, depending on the type of the display apparatus 50, the distance between the position of the front and that of the display surface 51 may be longer than the above h3+h1 by 0.5 mm. In that case, the shoulder 81c is shaved off by 0.5 mm. By this, the length of the inward-bent portion 43 from the front side of the front cabinet 40 toward the rear side is also molded longer by 0.5 mm, surely resulting in the display surface 51 and the panel touching surface 43a being in the rough-contact state, when the display apparatus 50 is housed in the produced front cabinet 40.

Accordingly, with the metal mold 60 of the present invention, it is possible to change the position of the panel touching surface 43a of the inward-bent portion 43 by a simple operation of shaving off the shoulder 81c of the female mold 80 by required thickness. This makes it possible to eliminate, more easily and at shorter times than when making changes to the conventional metal mold 10, the clearance between the display surface 51 and the panel touching surface 43a, which may be resulted from employment of different types of display apparatuses 50, and thereby to prevent the television from being treated as defective. Moreover, since shaving off a metal mold member is easier than adding a metal mold member by welding, and can be done more precisely, the present invention that requires only the operation of shaving off a metal mold member is a metal mold that is very effective for the positional adjustment of the panel touching surface 43a requiring strict precision.

Figure 6:
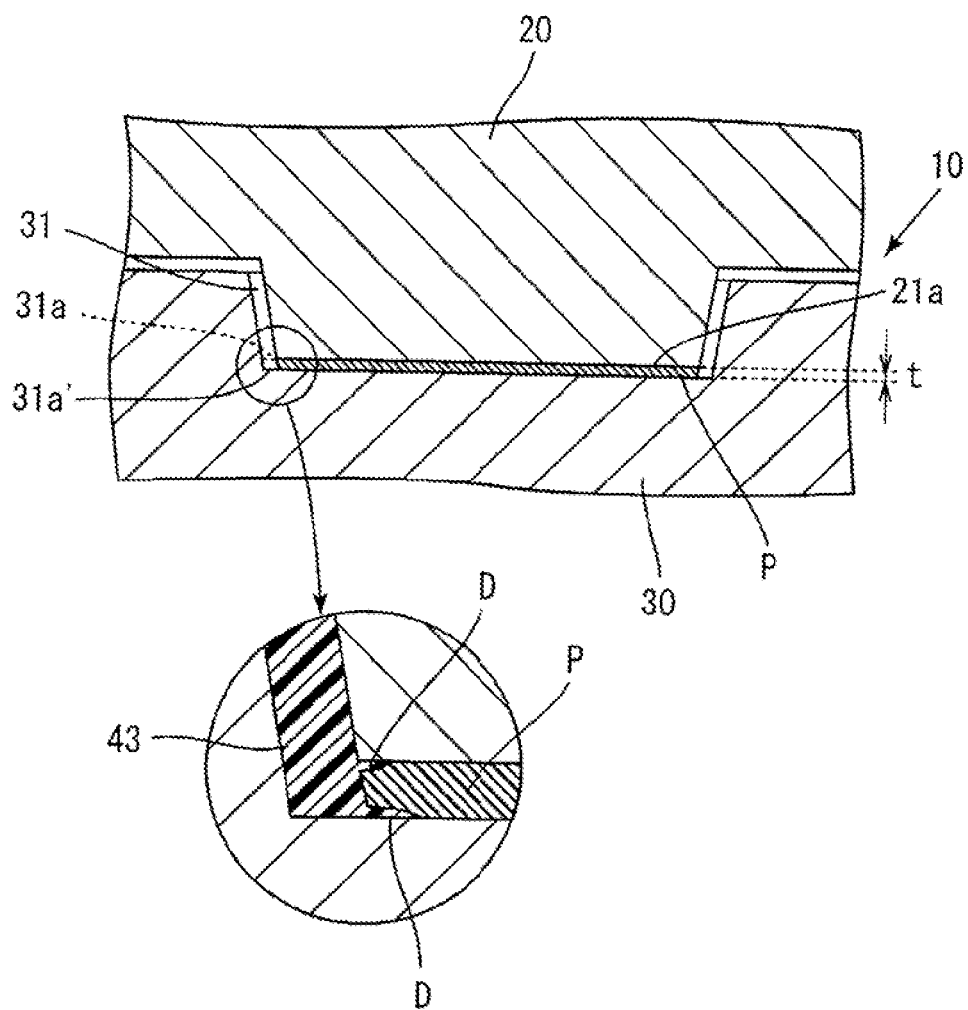
FIG. 6 is a partial cross-sectional view of a modification of a conventional metal mold structure.

If the positional adjustment of the panel touching surface 43a is made by the conventional way of modifying the metal mold 10, when resin is injected into the space formed by the modified metal mold 10, a so-called horizontal flash D jutting out toward the inside of the opening 42 of the front cabinet 40 tends to be formed on the inward-bent portion 43, as shown in the enlarged view of FIG. 6. This is because narrow clearances that may be created at the welded area when a metal mold member P is welded to the top 21a, or an error occurs in the distance between the top of the welded metal mold member P and the shaved bottom 31a' and they will not be in close contact with each other, which often creates narrow clearances and resin penetrates into such clearances, thus resulting in the horizontal flash D. This horizontal flash D will naturally deteriorate the quality of the front cabinet 40 and an extra work of removing the horizontal flash D will be needed.

According to the present invention, however, the task of welding a metal mold member is not required for the adjustment of the panel touching surface 43a. Furthermore, the shape of the side of the opening 42 in the inward-bent portion 43 that is adjustable in length within the range of the difference h2 between the shoulder 81c and the bottom 81a is always determined by the shape of the side 71b of the convex portion 71. Therefore, there is no room for undesired clearances creating the above horizontal flash to be formed, and consequently the horizontal flash will not occur.

That is, the metal mold 60 of the present invention has a structure capable of easily and precisely accommodating a positional change of the panel touching surface 43a of the inward-bent portion 43, and a structure with which to be able to produce the front cabinet 40 having a higher quality than the conventional metal mold.

The foregoing invention has been described in terms of preferred embodiments. However, those skilled, in the art will recognize that many variations of such embodiments exist. Such variations are intended to be within the scope of the present invention and the appended claims.

I claim:

1. A mold, comprising:
   a male mold;
   a female mold;
   the male mold and the female mold are used to mold a front cabinet of a display apparatus;
   said male mold has a convex portion that is projected from a first surface, with the convex portion comprising a substantially flat top and sides;
   said female mold has a concave portion within which said convex portion is accommodated;
   the female mold includes a second surface that is intimately spaced apart from the first surface when the male mold and the female mold are coupled, with the space used to mold an edge of a front side opening of the front cabinet for exposing a display surface of said display apparatus housed in said front cabinet;
   the concave portion of the female mold, includes:
   a recessed, substantially horizontally oriented alcove section forming a cavity with a bottom;
   protruding adjacent the bottom is a first wall with an elevated apex area surrounding the bottom that form shoulders; and
   protruding from the shoulders and ending at the second surface is a second wall surrounding the concave portion, with the second wall longer than the first wall;
   the bottom of the concave portion of the female mold accommodates the top of the convex portion of the male mold;

the first wall contacts a lower section of the sides of the convex portion of the male mold when the bottom contacts the top;

a first corner edge formed at a first vertex edge joining the bottom and the first wall contacts a second corner edge formed at a second vertex edge joining the top with the sides;

the shoulders provide an intimate space with a longitudinal section equal to a rise of the second wall, with the intimate space created between the sides of the convex portion of the male mold and the second wall when the bottom contacts the top;

the longitudinal section of the intimate space formed between the sides and the second wall is used to mold an inward bent portion of the front cabinet that bends toward an inside of the front cabinet;

the shoulders include a shoulder surface that is transverse the longitudinal section. which is used to mold a panel touching surface of the front cabinet that contacts the display surface;

with the bottom corresponding to the maximum variation in a distance between the panel touching surface of said front cabinet and said display surface of said display apparatus for accommodating different size display apparatuses, with maximum variation in the distance commensurate to adjustments in the longitudinal section to a maximum height, which is equal to a collective rise of the first wall and the second wall after removal of the shoulders, thereby expansion of the bottom to the second wall.

2. A mold, comprising:

a first mold section;

a second mold section;

said first mold section has a convex portion that is projected from a first surface, with the convex portion comprising a substantially flat top and sides;

said second mold section has a concave portion within which said convex portion is accommodated;

the second mold section includes a second surface that is intimately spaced apart from the first surface when the first mold section and the second mold section are coupled;

the concave portion of the second mold section, includes:

a recessed, substantially horizontally oriented alcove section forming a cavity with a bottom;

protruding adjacent the bottom is a first wall with an elevated apex area surrounding the bottom that form shoulders; and protruding from the shoulders and ending at the second surface are second walls of the concave portion, with the second walls longer than the first wall;

the first wall contacts a lower section of the sides of the convex portion of the first mold section when the bottom contacts the top;

a first corner edge formed at a first vertex edge joining the bottom and the first wall contacts a second corner edge formed at a second vertex edge joining the top with the sides;

with the bottom corresponding to the maximum variation in a distance between the front of said front cabinet and said display surface of said display apparatus for accommodating different size display apparatuses, with maximum variation in the distance commensurate to adjustments in a height of the second wall by removal of the shoulders to a depth equal to the bottom.

3. A metal mold according to claim 2, wherein:

a space formed between said first surface and said second surface, the second wall of the concave portion and a side of said convex portion are used to mold said front cabinet of said display apparatus.

4. A mold according to claim 3, wherein:

an edge of a front side opening for exposing said display surface of said display apparatus is molded by using the space formed between said first surface and said second surface, and a contacting portion to said display surface is molded by using the space formed between the second wall and shoulders, and the side of the convex portion.

5. A mold according to claim 3, wherein:

a difference in variations in height between the shoulders and the bottom of said concave portion corresponds to variations in the distance between the front of said front cabinet and the display surface of said display apparatus that can be housed in said front cabinet.

* * * * *